Figure 1:
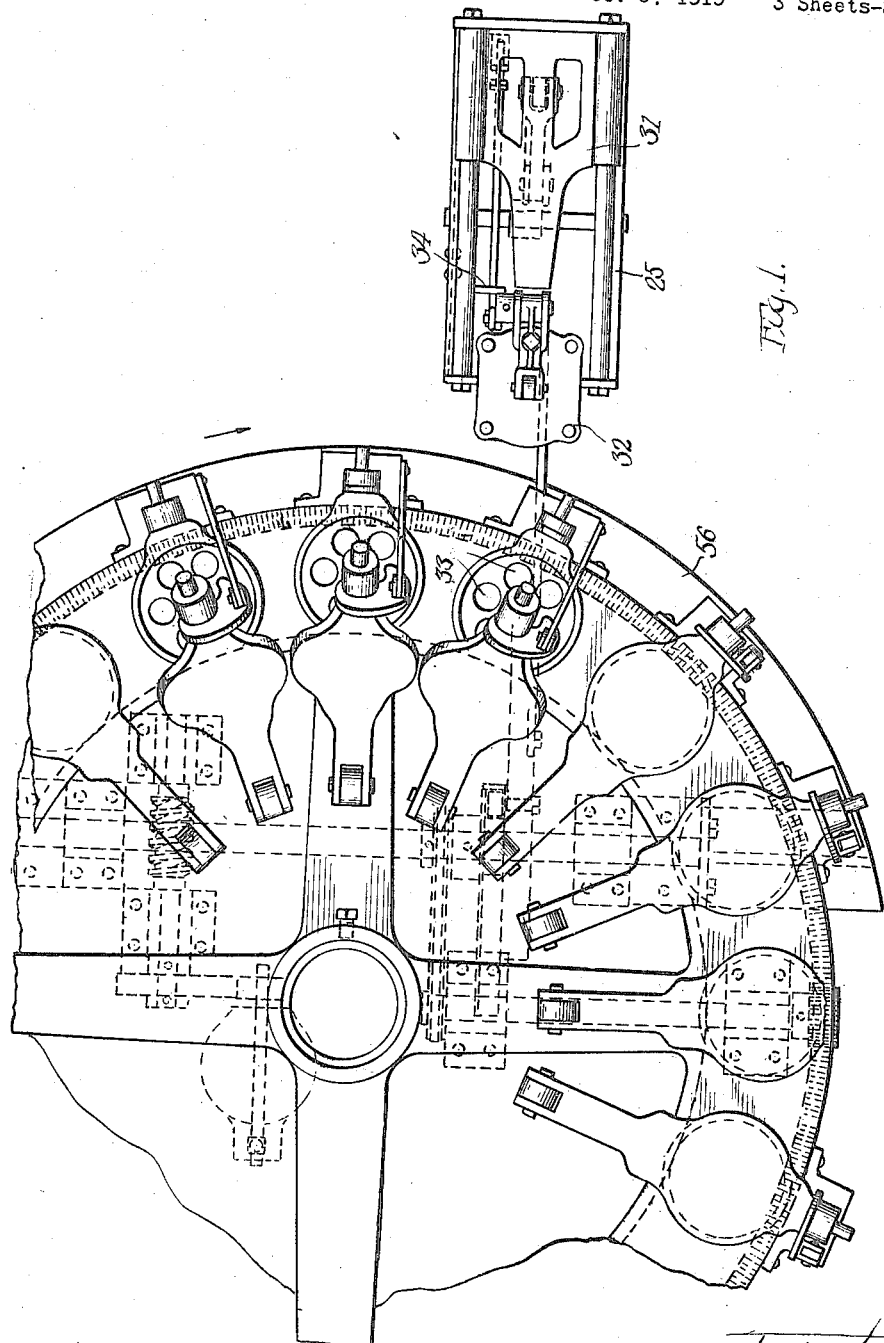

July 1, 1924.

S. E. WINDER 1,499,493

FEEDING MECHANISM

Original Filed Dec. 8, 1919    3 Sheets-Sheet 1

Witness:
W. K. Olson

Inventor:
Samuel E. Winder.
By Andrews & Lundell
Atty.

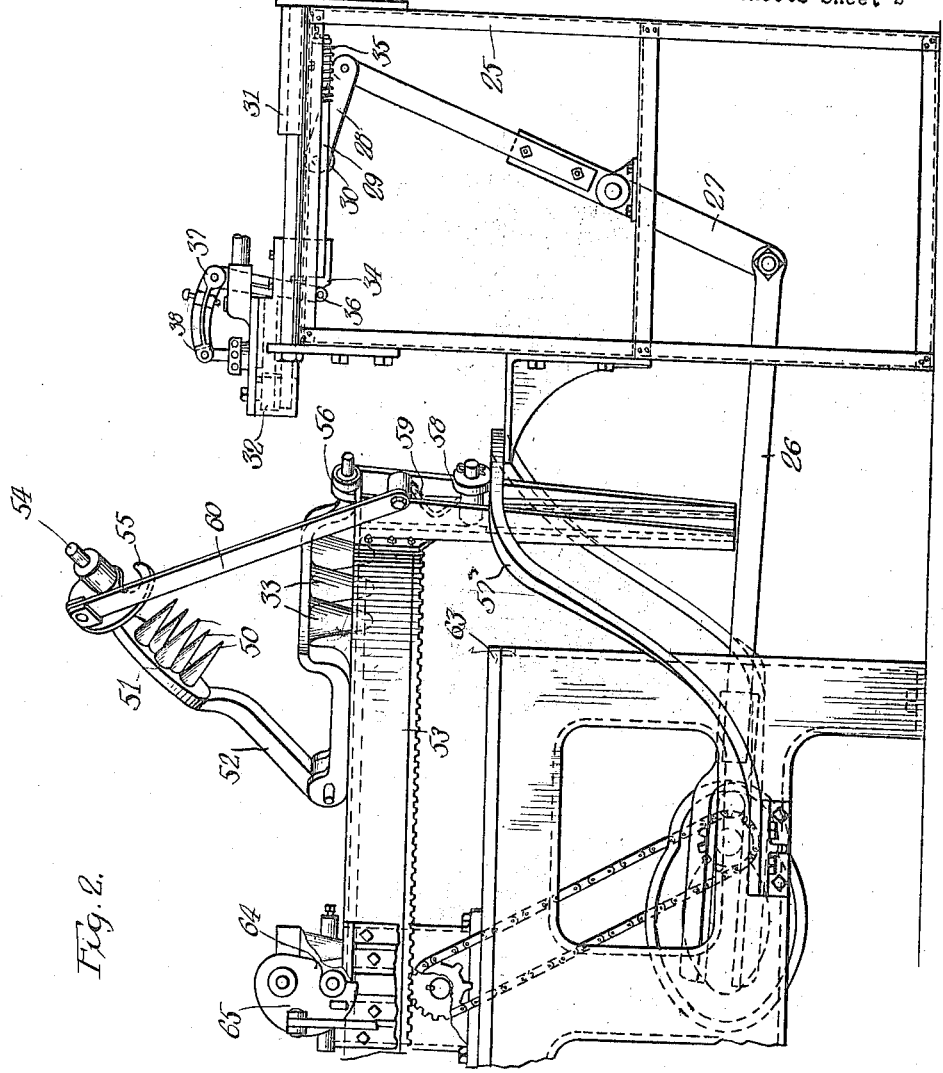

July 1, 1924.
S. E. WINDER
1,499,493
FEEDING MECHANISM
Original Filed Dec. 8, 1919 3 Sheets-Sheet 3
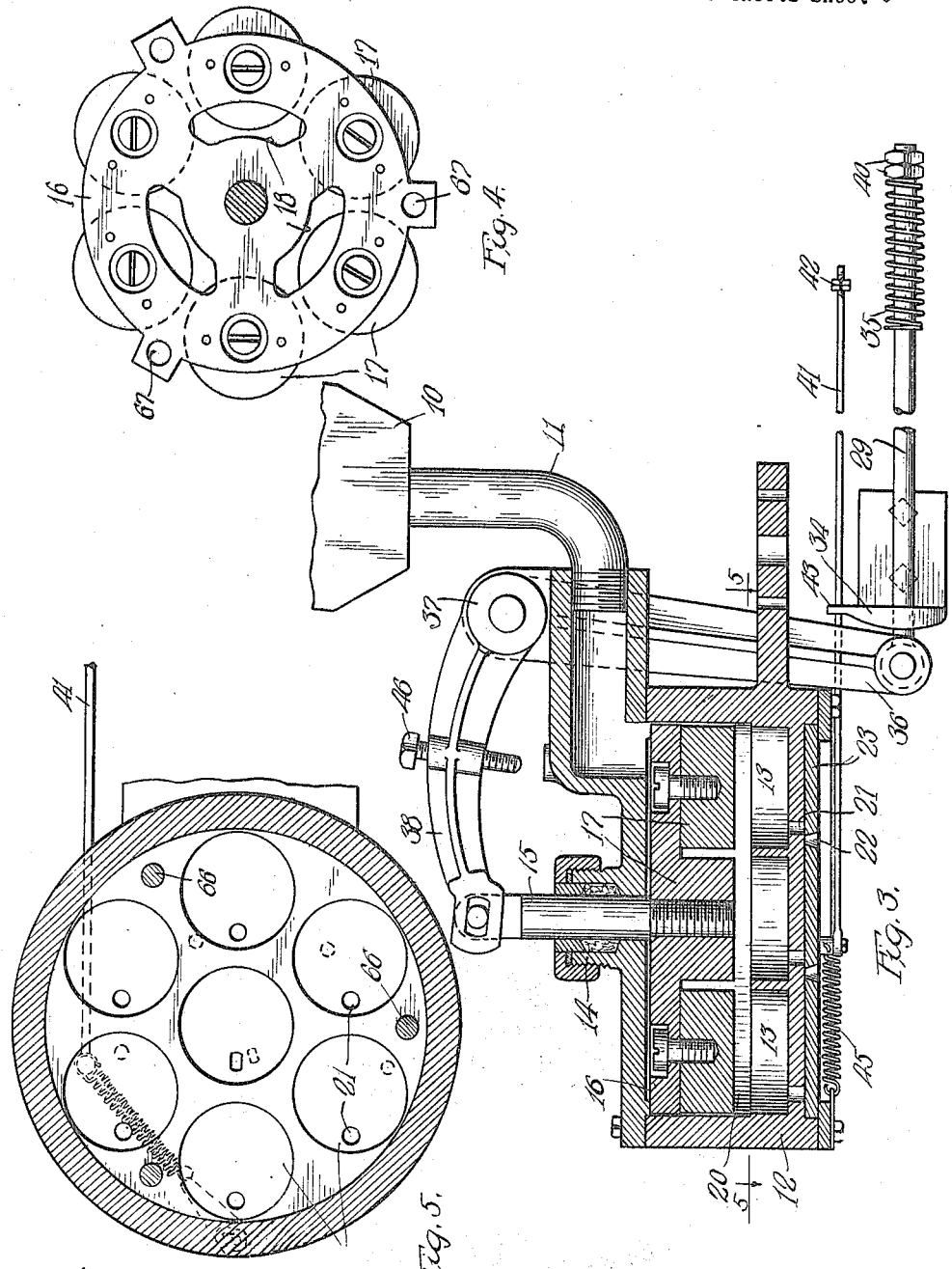

Patented July 1, 1924.

1,499,493

UNITED STATES PATENT OFFICE.

SAMUEL E. WINDER, OF CHICAGO, ILLINOIS, ASSIGNOR TO NOVELTY PRODUCTS, INC., OF CHICAGO, ILLINOIS, A CORPORATION OF ILLINOIS.

FEEDING MECHANISM.

Application filed December 8, 1919, Serial No. 343,274. Renewed October 1, 1923.

*To all whom it may concern:*

Be it known that I, SAMUEL E. WINDER, a citizen of the United States, residing at Chicago, in the county of Cook and State of Illinois, have invented certain new and useful Improvements in Feeding Mechanism, of which the following is a specification.

This invention relates to devices for feeding semi-liquid substances, such as thin batter, to suitable machinery or devices for the purpose of forming the liquid or batter by cooking or otherwise into suitable shapes; and it applies particularly to machinery where a plurality of substances are to be formed simultaneously. One of the objects of the invention is to provide a feeding device for the purpose above specified, that will feed accurately a predetermined amount of the liquid into a plurality of devices very quickly. Another object of the invention is to provide feeding means which will be very dependable and easy to manipulate and to take apart and to clean. Further objects of the invention will appear from a consideration of the following description of the device.

Of the drawings Fig. 1 is a plan view of the device, and a portion of an ice cream cone manufacturing machine which is fed by my device. Fig. 2 is an elevation of the device and the portion of the cone forming machine. Fig. 3 is a vertical sectional view of the feeding device. Fig. 4 is a plan view of the feeding device with the casing removed. Fig. 5 is a sectional view along the line 5—5 of Fig. 3. Fig. 6 is a fragmental elevation of the cone forming mechanism.

In order to illustrate my invention I have selected its application to an ice cream cone forming and cooking machine, the feeding device being used to supply in proper quantities and times a predetermined amount of ice cream cone batter to a plurality of the molds in which the ice cream cones are formed and cooked. It is to be understood, however, that the use of the feeding device is not at all confined to this particular purpose, but applies equally as well to the manufacturing of candies, and to many other goods and other substances. And it is further to be understood that the particular mechanism which I hereinafter set forth with much detail may be departed from by those skilled in the art without departing from the spirit of my invention as set forth in the claims of this specification.

In the use of my device any suitable mechanism may be provided for supplying liquid or batter to the device. For the purpose of illustration I have shown in the drawings a hopper 10, elevated above the device so that the action of gravity will force the batter through the pipe 11 to the feeding device. The device comprises a casing 12, which in this particular instance I have shown cylindrical, but which may be of any suitable shape; and the lower portion of the device is divided into a plurality of chambers 13, ordinarily of uniform size and shape. A stuffing box 14 is mounted on the upper wall of the casing, and through this box passes a stem 15 which is fixed, at its lower end, to a spider shaped mechanism 16; and supported by the spider 16 are a plurality of plunger members 17. The shapes of the plungers are such that they will pass into and fit snugly in the chambers 13 when the stem 15 is pressed downwardly carrying with it the spider 16 and the plungers; the plungers being positioned so that each registers with its own chamber 13. Openings 18 are provided in the spider, and the diameter of the main portion of the spider being materially less than the diameter of the chamber of the casing 12, any liquid or batter that is passed on top of the spider will flow freely through the openings and around the periphery of the spider into the chamber 20 below and also into the various chambers 13. Hence when the batter is placed in the hopper 10, and the stem 15 is in its normal raised position, as indicated in Fig. 3, the batter will flow down through pipe 11 and then through the openings 18 into the chamber 20, and will fill all of the chambers 13.

The invention comprises means for pressing downwardly on the stem 15, and hence upon each of the plungers 17, so as to press the plungers downwardly on the batter in the chambers 13, and at the proper time to force the batter out of the chambers through openings 21 provided in the bottom wall of the casing 12, then through openings 22 in a plate 23 when the openings 22 are brought in registry with the openings 21; it being understood that the registration of the openings is produced at the time it is desired to have the batter flow out into the receiving receptacles.

The means which I have provided for pressing downwardly on the plungers 17, and for bringing the openings 21 and 22 into registry, and also for bringing the feeding device into a proper position for feeding the batter into the receiving receptacles, are as follows: The feeding device is slidably mounted on a suitable framework 25, and may be operated by any suitable means. In this instance I have shown the device as being operated by a reciprocating arm 26, suitably connected to the driving mechanism of the ice cream cone forming machine. The arm 26 is pivoted to a lever 27 so as to cause the link 28, connected to the upper end of the lever, to be reciprocated at proper times. The link 28 is pivoted to a lug 30 fixed to a slidably mounted frame 31 which supports the feeding device 32, hereinabove described, and causes the feeding device to be moved over the receiving receptacles 33 of the cone machine at the proper time for feeding the batter into the receptacles. As the frame 31 is moved forwardly towards the cone machine a stop 34, fixed to the frame 25, compresses the spring 35 encircling the rod 29 which passes through an opening in the lug 34, and this tends to force the arm 36 of the bell crank lever 37 to the right, and thus to force downwardly the arm 38 of the lever and press the plungers 17 into the chambers 13. By this means a pressure will be exerted upon the batter in the chambers 13, and the magnitude of the pressure will depend upon the amount of compression of the spring 35.

The plate 23 is rotatably mounted on the lower side of the bottom of the casing 12, and the openings 22 in the plate 23 are so positioned, with reference to the openings 21 in the bottom of the chambers 13, that by rotating the plate 23 to a certain position the openings 22 will register with the respective openings 21, and the batter will then be free to flow out of the chambers 13. One of the purposes of my invention, therefore, is to provide for the registration of these openings at the time the openings are over the receiving receptacles 33. To accomplish this I fix to the feeding device a rod 41 which passes through an opening in the lug 43, this lug also being fixed to the framework 25. The rod 41 is pivoted eccentrically to the plate 23; and as the device moves forwardly toward the receiving receptacles, the plate 23 is rotated by the lock nuts 42 on the rod 41 coming in contact with the lug 43. The nuts 42 are so adjusted that, as soon as the openings 21 are over the respective receptacles 33, the openings 22 will be brought into registry with the openings 21, and the batter will be free to flow out into the receptacles; and, by virtue of the compression of the spring 35, and hence the downward pressure on the plungers 17, the batter will be forced outwardly into the receptacles. When the chambers 13 are emptied of batter as much as is desired, the feeding device will be moved backwardly to its original position; and the spring 45 will rotate the plate 23 so as to close the openings 21, as soon as the lock nuts 42 pass away from the lug 43. At the same time the lug 34, coming in contact with the arm 36 will elevate the plungers 17 to their normally raised position, so that more batter may pass into the delivering chambers 13.

Evidently the amount of batter that is forced from the chambers will depend upon the downward pressure exerted by the plungers and the time that the openings 21 are in registry with the openings 22. The magnitude of the pressure may be adjusted by the spring 35 as explained by adjusting the positions of the lock nuts 40 on the rod 29. But, to more positively control the amount of batter flowing out I provide an adjustable stop 46 in the arm 38 so that the downward movement of the plungers 17 may be stopped wherever desired; and in this manner not only will the downward pressure on the batter in the chambers 13 be removed when the stop becomes effective, but the batter will stop flowing as soon as the downward movement of the plunger ceases because of the air pressure on the batter through the openings 21.

As a further means for regulating the amount of flow, the lock nuts 42 may be adjusted so as to bring the openings 21 and 22 into registration sooner or later as may be desired. In the normal operation the movement of the plate 23 may be such that at the instant the openings 21 reach the edge of the receiving receptacles 33, the openings 22 will begin to register so as to allow the batter to begin to flow, and this flow may be maintained as the openings 21 pass entirely across the receptacles 33 and back again, allowing the maximum amount of batter to flow; or the openings 21 may be a material distance beyond the edge of the receptacles 33 before the registration begins and hence also when the registration ends. It will thus be seen that by these various means the amount of batter delivered may be suitably controlled.

The machine to which I have in this instance applied my feeding device, for the purpose of illustration, comprises a well known form of ice cream cone molding and baking machine; and consists in part of the molds 33 and the plungers 50, which, at suitable times are forced into the molds 33, and are locked in that position until the batter has been sufficiently cooked. If not suitably locked in position the steaming of the batter in cooking may force the molds backwardly and form undesirable deformations of the cones. At the same time it is evident that these plungers must be removed entirely away from the molds so as to allow the feeding device to pass over the molds without coming in contact with the plungers. The means which I have provided for locking and unlocking and removing the plungers from the molds a suitable distance comprises the following. The plungers are fixed to a plate 51 pivoted by an arm 52 to any suitable point of the rotatable table 53 of the machine, the arm 52 being of sufficient length to allow the plungers to be moved upwardly from the molds after the baking process without injury to the cones. A pin 54 projects from the other side of the plate 51 and has pivoted thereto a hook 55 which is adapted, when the plungers are in place, to hook under the roller 56 rotatably mounted on the table 53 of the machine. A camway 57 is fixed to the framework 63 of the machine, and, as the table 53 rotates, carrying with it the molds, a cam roller 58, pivoted to a slidably mounted member 59, forces upwardly and downwardly at suitable times the link 60 which is pivoted to the hook 54.

Normally when the cam wheel 58 is in its lowest position, the plungers are in place in the molds, the link 60 is down and the hook 55 is hooked beneath the roller 56. As the cam wheel 58 is raised by the cam 57 the link 60 is forced upwardly, and the upper end of the link rotates the plates, and thus unhooks the hook 55 from the roller 56; and when the pin 61 which is fixed to the hook 55, comes in contact with the link 60, the hook 55 ceases to rotate and the link raises the plate 51 to the position indicated in Fig. 2, the plungers then being out of the way of the feeding mechanism. After the feeding mechanism has returned to its right hand position and the ice cream cones have been removed from the molds in any suitable manner, the cam wheel 58 passing downwardly on the lower portion of the cam way 57 allows the force of gravity to press downwardly the plate 51 and the link 60 until the hook 55 is in such a position that the link 60 can rotate the hook under the roller 56 and lock the plungers in place.

As the mold plungers 50 tend to stick to the baked cones, I also provide the following described means for breaking the plungers loose from the cones: A shoulder 64 is formed on the hook plate 65 so that it projects slightly below the upper surface of the roller 56 when the hook 55 is under the roller. As the plate 65 is rotated, and after the hook is unhooked, the shoulder 64 acts as a cam on the roller 56, and forces the plate 51 and plungers 50 upwards away from the cones. After thus breaking the plungers free from the cones the link 60, coming in contact with the pin 61, raises the plungers without difficulty.

It is common practice to have the mold table 53 rotate continuously, and hence the arrangement of the parts must be such that the batter can be delivered into the molds as they are moving. To this end I arrange the mechanism so that, as the feeding chambers 13 pass over the molds 33, the apertures 21 will be somewhat to one side of a radial line passing from the center of the axis of the table through the center of the mold; and the movement of the mold will be such that, by the time the aperture passes away from the mold it will be on the other side of the radial line. This requires the apertures to have certain positions in the bottoms of the chambers, such as is indicated in Fig. 5, and the relative positions of the openings 22 are such as to insure opening and closing all of the apertures 21 substantially simultaneously.

To prevent any rotation of the spider 16 with reference to the chambers 13, I provide pins 66 which pass into openings 67 in the spider.

I claim as my invention:

1. Feeding mechanism comprising a closed casing, a plurality of cylindrical chambers in the bottom of said casing, each of said chambers having an outlet in the bottom thereof, a plate movably mounted in said casing, a plurality of pistons fixed to said plate, the respective pistons registering respectively with said chambers, said plate having openings therethrough between said pistons, means for passing a semi-liquid substance into said casing above said plate, means for reciprocating said said plate vertically, and means for opening and closing said outlets.

2. Feeding mechanism comprising a closed casing, a plurality of cylindrical chambers in the bottom of said casing, each of said chambers having an outlet in the bottom thereof, a plate movably mounted in said casing, a plurality of pistons fixed to said plate, the respective pistons registering respectively with said chambers, said plate having openings therethrough between said pistons, means for passing a semi-liquid substance into said casing above said plate, means for reciprocating said plate vertically, means for opening and closing said outlets, a stuffing box mounted in the cover of said casing, and a portion of said reciprocating means passing through said stuffing box.

3. Feeding mechanism comprising a casing having a plurality of cylindrical chambers in the bottom thereof, the upper ends of said chambers being open, and each of the lower ends of said chambers having an aperture therethrough, a plate rotatably mounted immediately beneath the bottom of said casing, said plate having a plurality of openings therethrough, said respective openings being positioned in said plate so as to register respectively with said apertures when said plate is rotated to one position; in combination with means for passing a semi-liquid substance into said chambers, a plate slidably mounted in said casing, a plurality of pistons fixed to said plate, said pistons registering respectively with the respective chambers, and means for pressing down on said plate.

4. Feeding mechanism comprising a casing having a plurality of separate chambers in the bottom thereof, each of said chambers having an aperture through the bottom thereof, a plate rotably mounted immediately beneath the bottom of said casing, said plate having a plurality of openings therethrough, said respective openings being positioned in said plate so as to register respectively with said apertures when said plate is rotated to one position; in combination with means for passing a semi-liquid substance into said chambers, means for rotating said plate so as to open and close said apertures, and means for pressing down on said substance in each of said chambers.

In testimony whereof, I hereunto set my hand.

SAMUEL E. WINDER.